United States Patent
De Vita

(10) Patent No.: US 7,983,950 B2
(45) Date of Patent: Jul. 19, 2011

(54) METHOD FOR DISPLAYING CATALOG INFORMATION IN AN E-COMMERCE SYSTEM

(75) Inventor: Filippo De Vita, Rome (IT)

(73) Assignee: Beeweeb S.p.A., Rome (IT)

( * ) Notice: Subject to any disclaimer, the term of this patent is extended or adjusted under 35 U.S.C. 154(b) by 673 days.

(21) Appl. No.: 12/088,930

(22) PCT Filed: Oct. 10, 2005

(86) PCT No.: PCT/IT2005/000588
§ 371 (c)(1),
(2), (4) Date: Apr. 1, 2008

(87) PCT Pub. No.: WO2007/043067
PCT Pub. Date: Apr. 19, 2007

(65) Prior Publication Data
US 2008/0255963 A1    Oct. 16, 2008

(51) Int. Cl.
*G06Q 30/00*     (2006.01)
(52) U.S. Cl. ............................................ 705/26; 705/27
(58) Field of Classification Search .................... 705/26, 705/37
See application file for complete search history.

(56) References Cited

U.S. PATENT DOCUMENTS

2003/0037041 A1* 2/2003 Hertz ................................ 707/1
2004/0059755 A1  3/2004 Farrington et al.
2006/0259856 A1* 11/2006 Atkins ........................... 715/517

FOREIGN PATENT DOCUMENTS
WO    WO 00/73964    12/2000

OTHER PUBLICATIONS

PCT International Search Report for PCT/IT2005/000588 filed on Oct. 10, 2005 in the name of Beeweeb S.r.L., et al.
Thomas S. Messerges, et al. entitled "Digital Rights Management in a 3G Mobile Phone and Beyond" in DRM '03, Oct. 27, 2003, pp. 27-38, XP002386098, pp. 27-32.
"Multimedia Audio on Demand" IBM Technical Disclosure Bulletin, IBM Corp, New York, US, vol. 37, No. 6B, Jun. 1, 1994 pp. 451-459; ISSN: 0018-8689.
International Business Machines Corporation entitled "A Dynamic Tree GUI element for internet/intranet web applications in multi-user environments" in Research Disclosure, Mason Publications, Hampshire GB, vol. 449, No. 124, Sep. 2001, XP007128978; ISSN: 0374-4353, p. 1-2.
PCT Written Opinion for PCT/IT2005/000588 filed on Oct. 10, 2005 in the name of Filippo De Vita.

* cited by examiner

*Primary Examiner* — James Zurita
(74) *Attorney, Agent, or Firm* — Steinfl & Bruno LLP

(57) ABSTRACT

Method to visualize the information related to a catalog on an processing device (2) that includes a user's interface comprising a display (3). The method includes a looking through step of a database (11) that stores an E-catalog of items that can be purchased by use of said device (2). At logic-content level the database is organized according to the hierarchical tree-type structure (15) wherein the items that can be purchased are the leaf nodes (T1, ... T5) of the tree and the groups of items are the intermediate nodes of the tree placed at different hierarchical levels that are higher than the hierarchical level of the leaf nodes.

14 Claims, 3 Drawing Sheets

METHOD FOR DISPLAYING CATALOG INFORMATION IN AN E-COMMERCE SYSTEM

This application is the national phase of International Application PCT/IT2005/000588 filed on Oct. 10, 2005.

The present invention refers to a method for displaying information about an E-catalog on an processing device including a user's interface provided with a display.

As known, further to the birth of E-commerce, the suppliers of goods and services have developed E-catalogs that can be looked through from remote stations, and through which potential customers can receive and visualize information about the goods and services offered by the seller, including descriptions, images, prices and information about availability.

Usually, the information taken from the E-catalogs are visualized on a user's terminal, or client terminal, remotely connected to a remote unit, or server, which includes a database containing the catalog to be looked through. Through the client terminal—which can be for instance a standard PC or a mobile personal communication device, such as a cellular phone—it is then possible to carry out the remote purchase of an item or service listed in the E-catalog, after having examined the pieces of information extracted from the E-catalog.

In view of the ever increasing popularity of the E-commerce systems, the need was felt to make the looking through the E-catalogs particularly easy for the user, so that the remote purchase procedure could become faster and more efficient.

This need is satisfied through a visualization method as described in the attached claim 1 in its most general form, and in the dependent claims in the preferred embodiments.

Further characteristics and advantages brought about by the invention will be better understood by reading the following detailed description of the preferred embodiments of the invention, which are illustrative, and therefore are not limiting, with reference to the attached figures. As to the figures.

Figure 1:
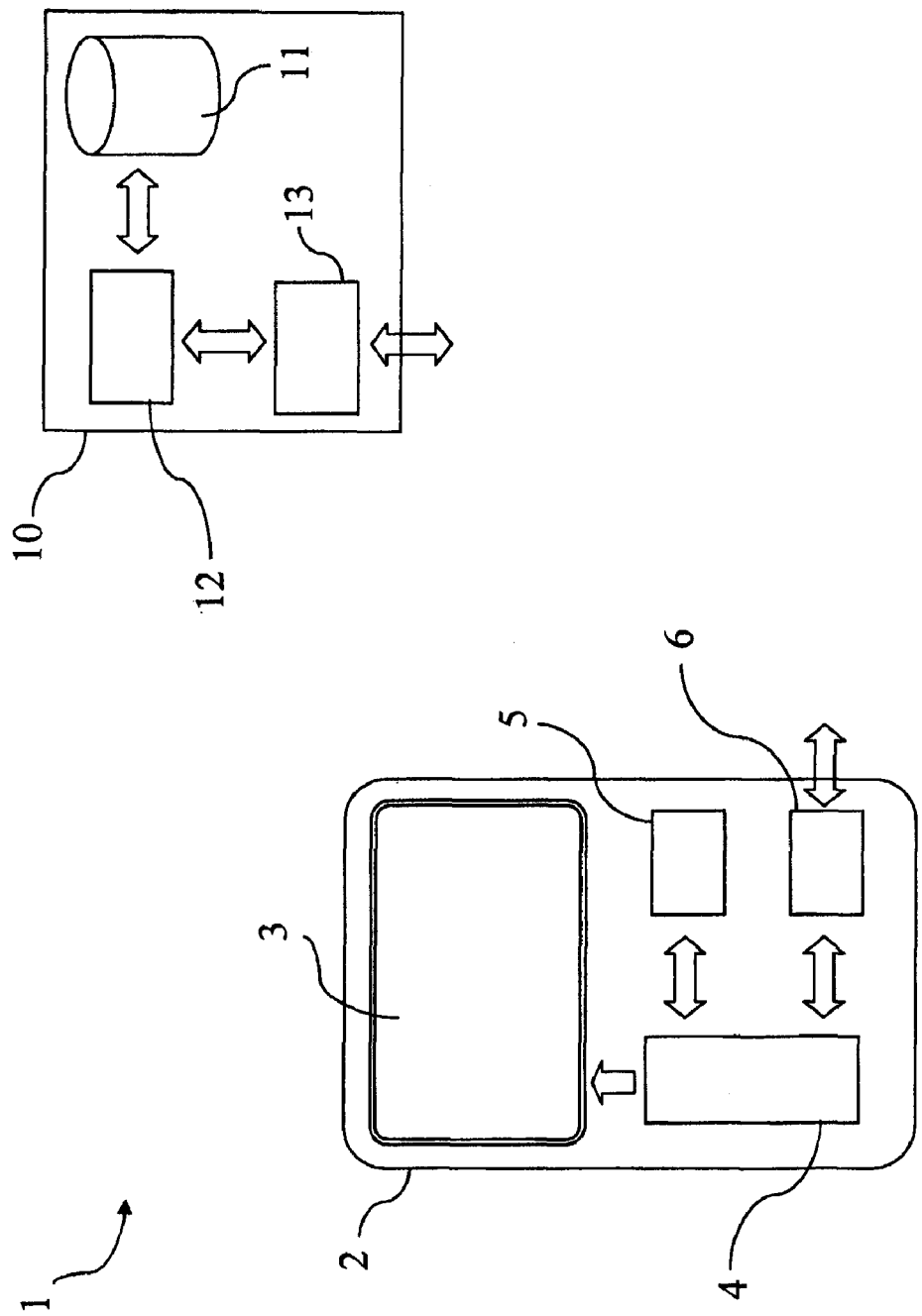
FIG. 1 shows a block diagram of a particularly preferred example of a computer system through which a method according to this invention can be implemented.

In the figures, the items that are the same or similar are identified by means of the same numerical references.

A preferred form of a computer system through which a method according to this invention can be implemented is described by reference to FIG. 1. The computer system 1 includes a data processing device 2 which in the described particular embodiment is a personal mobile communication device, but this is not a limiting feature.

In a particularly preferred embodiment, the data processing device 2 is, for instance, a cellular phone. In an alternative embodiment, the data processing device is a PC that can be connected to a network, or a palmtop. In yet another embodiment, the device 2 is a reader of multimedia/music files fitted with a communication interface for connection to a telecommunication network.

In the following part of this description, the data processing device 2 will be designated "user's terminal 2".

The user's terminal 2 includes: a user's interface provided with a graphic display 3, data processing means 4, at least one fixed or removable local memory 5, a communication interface 6 for the connection of the user's terminal 2 to a telecommunication network. The preferred type of graphic display 3 is a color LCD. As an alternative, the graphic display 3 can be a monochromatic display. The graphic interface of the display 3 should be preferably written in Java.

The data processing means 4 includes, for example, a processing unit destined to process the data fed by the memory 5 or the reception/transmission interface 6. The data processing unit is also destined to manage and monitor the memory 5, the graphic display 3 and the communication interface 6.

As shown schematically in FIG. 1, the computer system 1 also includes a server 10 containing a database 11, a unit 12 for querying/managing the database 11 and a communication interface 13 for the connection of the server 10 to a telecommunication network. Such a telecommunication network, which is not shown in FIG. 1, provides a bi-directional connection for data exchange between the user's terminal 2 and the server 10. Data exchange occurs through the communication interfaces 6 and 13 respectively. The preferred type of network is a wireless one, but can be any other type, for instance a wired network or a hybrid network.

The database 11 permits an E-catalog to be memorized which includes a list of items that can be purchased by a user through the user's terminal 2. Such items can be either goods or services. In a particularly preferred embodiment, the items listed in the catalog are essentially digital data that can be downloaded by the user by means of the user's terminal 2, and which are preferably contained in a database that can be accessed through server 10. For instance, the data are memorized in the same database 11 that also stores the E-catalog. As an alternative, the digital data are memorized in another database not shown in the figure. In a particularly preferred embodiment, such digital data are files with multi-media contents, e.g. audio files, image file, video files. As an alternative, the same digital data make up computer programs, such as, for instance, games or miscellaneous utilities.

Figure 2:
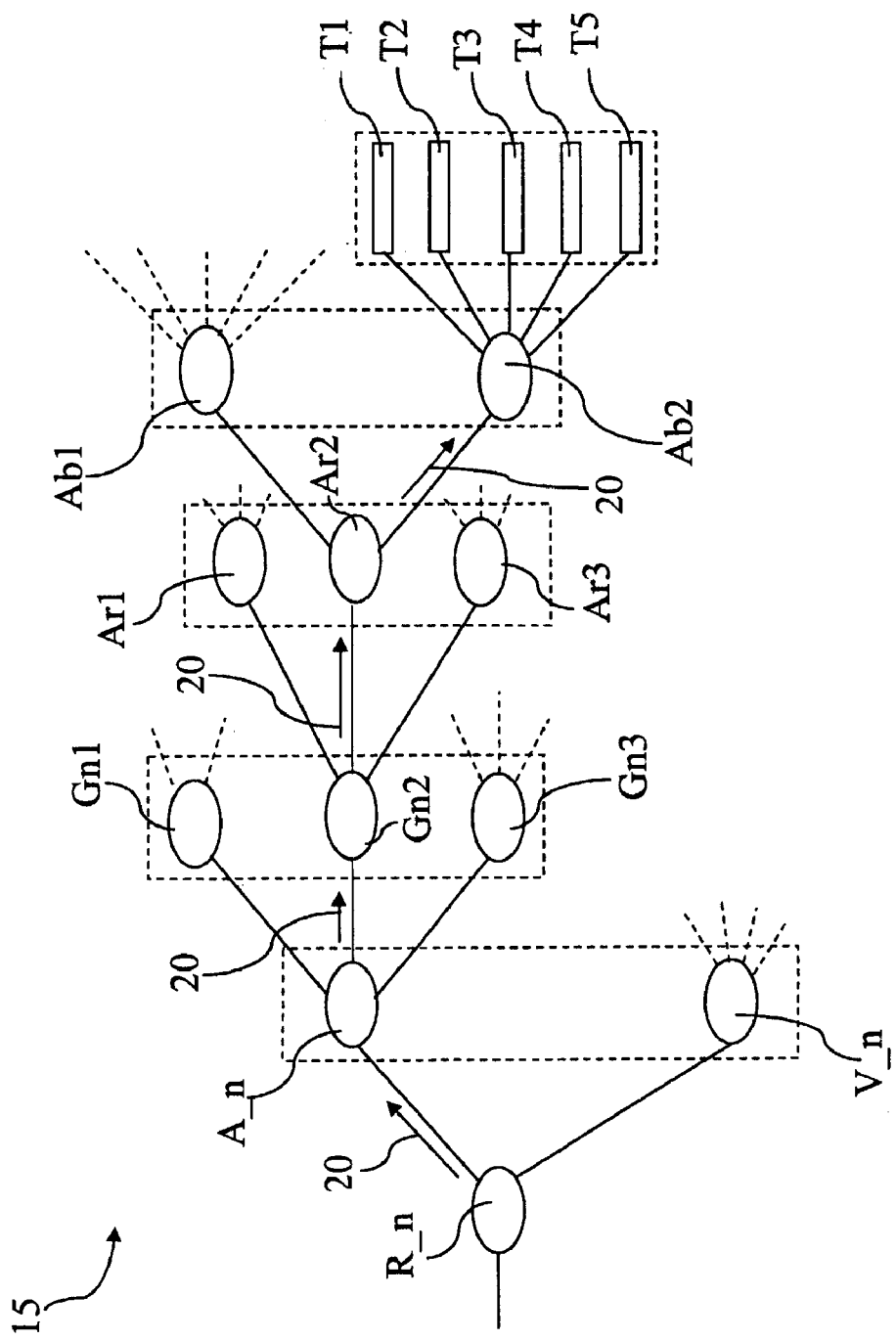
FIG. 2 shows a schematic example of the hierarchical tree structure that can be used to organize the data of an E-catalog.

FIG. 2 shows an example of architecture that can be advantageously used to organize the E-catalog contained in the database 11 to FIG. 1. As shown in FIG. 2, the organization of the E-catalog at logic/content level is advantageously realized through a tree-type hierarchical structure 15 in which the items listed in the catalog are the leaf nodes T1, . . . , T5 of the tree structure, i.e. the nodes of the tree structure 15 from where no further branches branch off. Within the tree structure 15, the leaf nodes T1, . . . , T5 are the nodes that have the lowest hierarchical level.

In the tree structure 15 of the E-catalog, the sets formed by one or more items that are similar at logic/content level form groups of items corresponding to intermediate nodes A_n, V_n, Gn1-Gn3, Ar1-Ar3, Ab1-Ab2 of the tree structure 15. Based on the aggregation level, higher and higher hierarchical levels are assigned to such groups along the path that links the leaf nodes T1, . . . , T5 to a root node R_n. At logic level, the latter is the group, or set, that includes all the items listed in the E-catalog.

In the particularly preferred embodiment in which the items in the catalog are multi-media files, the E-catalog is organized to include for instance two macro-groups of items corresponding to the intermediate nodes A_n, V_n, which contain all the audio-only files and all the video and audio/video files respectively. For the sake of simplicity, from this point on, only the portion of the tree structure 15 related to intermediate node A_n will be described in detail in this description. This is the tree section that contains the audio-only files. These files are, for instance, the audio files in compressed format, i.e. preferably mp3 files.

In the example in FIG. 2, the intermediate node A_n that is the whole of the audio files in the E-catalog, has three "child" nodes, viz. Gn1, Gn2, Gn3, which relate to groups of files in the E-catalog that respectively include all the catalog files assigned to music genres one, two and three. As an example, music genre one might be "Rock", genre two "Jazz" and genre three "Pop". Obviously, it is possible to consider a tree structure 15 having a higher or lower number of music genres.

Considering again the example in FIG. 2, the intermediate nodes Gn1, Gn2, Gn3 have other branches. For the sake of simplicity only those of intermediate node-Gn2 are shown. In particular, the considered intermediate node has three "child" nodes, viz. Ar1, Ar2, Ar3, that correspond to groups of files in the catalog that belong to the same music genre and which include, respectively, all the catalog files that may be assigned to artist one, two or three. Obviously, it will be possible to consider for each node corresponding to a music genre—an architecture of the tree structure 15 having a higher or lower number of intermediate "child" nodes based on the range of items in the catalog.

Still with reference to the example in FIG. 2, the intermediate nodes Ar1, Ar2, Ar3 have other branches of which only those related to intermediate node Ar2 are shown for the sake of simplicity. In particular, intermediate node Ar2 has two "child" nodes, i.e. Ab1, Ab2, which correspond to the groups of files in the catalog related to the same music genre and to the same artist but each of which contains only the catalog files listed as belonging to album one or album two by the same artist.

Obviously, it will be possible to consider, for each node corresponding to a given artist, an architecture of the tree structure 15 having a higher or lower number of intermediate "child" nodes based on the range of items in the catalog. This is done to take into account the inclusion in the catalog of music files related to an artist and contained in many or few more or albums.

Eventually, as shown in FIG. 2, also the intermediate nodes Ab1, Ab2 have additional branches. In this respect, only those related to intermediate node Ab2 are shown in the figure for the sake of simplicity. In particular, the intermediate node Ab2 has "child" nodes T1, . . . , T5 that are the leaf nodes of the tree structure. In this example each of them corresponds to a music file belonging to the album identified through node Ab2.

In order to summarize, in the example provided, the tree structure 15 of the E-catalog is characterized by the following organization/division criterion:

Root node
Type of file (audio or video);
Genre;
Artist;
Album;
Track.

It should however be borne in mind that different organization/division criteria can be used depending on the type of items listed in the E-catalog. For instance, in case the above said catalog should contain audio files only, and in case it should be awkward or impracticable to group the items based on the music genre, a simplified tree structure 15 could be used as the one the organization/division criterion applicable to which is described hereafter:

Root node
Artist;
Album;
Track.

In a first embodiment, the E-catalog contains a data structure for each item that can be purchased from the catalog. This structure includes a first data field that identifies the item and one or more data fields that contain information permitting the item position to be found in the tree structure. Besides, in a particularly advantageous embodiment in which the database 11 of server 10 does not only include the E-catalog, but also the same items as the catalog (which consequently are files or groups of files), the tree structure 15 can be reconstructed starting from the meta-data associated to those files.

Considering again the computer system in FIG. 1, advantageously, the user's terminal 2 is such as to retain in its memory a log including the information that permits the identification of the items already purchased from the E-catalog by the user. For instance, this log, that will be called history log hereinafter, is stored in a fixed memory 5 internal to the user's terminal 2, or, as an alternative, in a removable memory unit that is not shown in the figure. The latter unit can be a SIM (Subscriber Identity Module) card that can be inserted in the user's terminal 2.

In the case of the embodiment in which the E-catalog items are files that can be downloaded from the server 10 to the memory 5 of the user's terminal 2, the history log consists, advantageously, of the whole of the same meta-data associated to the already downloaded files and resident in the memory, or the history log can be obtained starting from such meta-data.

In an alternative embodiment, the history log is kept in the memory of the server 10, for instance in the same database 11 that stores the E-catalog, or is a remote log with respect to user's terminal 2.

Figure 3:
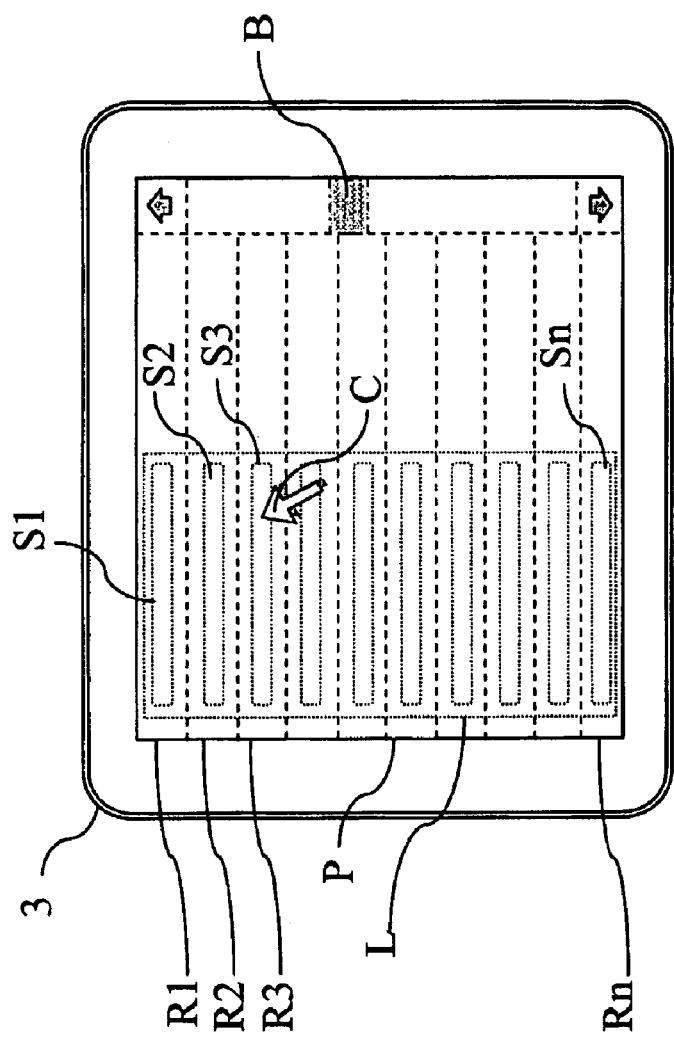
FIG. 3 shows schematically a page as displayed on a display of a user's terminal.

FIG. 3 shows in greater detail the display 3 of user's terminal 2, which is essentially a user's interface for the visualization of the E-catalog on the user's terminal 2, or a device that permits E-catalog portions to be selected.

In particular, in the method subject of this invention, the looking through of the E-catalog occurs as follows:

by establishing a connection between user's terminal 2 and the server 10;
by repeatedly interrogating the database 11 through the user's terminal 2 in order to navigate in or explore a tree structure 15 of the type shown in FIG. 2. This is obtained through the subsequent visualization of pages P on the display, which correspond to selected portions of the tree-like structure 15.

In a particularly preferred embodiment, a page P visualized on the display is arranged in a given number of lines R1, . . . , Rn on each of which there can be visualized a related textual or graphic symbol S1, . . . , Sn so that the displayed P page can show a list L of textual or graphic symbols (or elements) S1, . . . , Sn that are associated to the nodes of the tree structure that have the same hierarchical level and that descend directly from the same parent node.

Preferably, the textual or graphic symbols S1, . . . , Sn visualized on the display 3 provide an indication of the contents of the item groups identified by the nodes to which such textual or graphic symbols are associated. This means that the symbols evolve dynamically along with navigation. As an example only, this also means that if the visualized page P refers to the tree structure to FIG. 2, and the tree structure 15 is being explored at hierarchical level "music genre", the first line R1 on display 3 will show a textual symbol (e.g. a word) or a graphic symbol S1 (e.g. an icon) that provides an indication of the group of items in the catalog that are identified by the intermediate node Gn1. These are the items that are classed in the catalog as items belonging to the music genre associated to node Gn1. In the same vein, the second line R2 will show a textual or graphic symbol S2 that relates to the group of catalog items identified by intermediate node G2, and so forth. In this case, the list L of the textual or graphic symbols will contain only three elements S1, S2, S3 (corresponding to nodes Gn1, Gn2, Gn3 that are direct descendants of parent node A_n). However, should node A_n have a greater number of direct "child" nodes, list L, could fill all the lines of page P, or require a greater number of lines. In the latter case, page P could become a page to be scrolled by use of a scroll bar B or similar tools.

In order to explore the E-catalog by navigating through it, it is possible to expand one of the intermediate nodes associated to symbols S1, . . . , Sn of the visualized list L starting from a page P in view on the display. In this way, the visualization of a portion of the tree structure 15 that has a lower hierarchical level is obtained. As an alternative it is also possible to navigate the tree structure 15 in the "upstream direction" in order to visualize a tree structure portion that has a higher hierarchical level. For instance, if the page P in view refers to the tree structure to FIG. 2, and this structure is visualized on the display at hierarchical level "music genre", the first line R1 of the display will show a symbol S1 (textual or graphic) that indicates the content of the group of catalog items identified by intermediate node Gn1. In the same vein, the second line R2 will show a textual or graphic symbol that indicates the content of the group of catalog items identified by the intermediate node Gn2, and so forth. In this case, the list of textual or graphic symbols will be a list including only three elements, viz: S1, S2, S3 (corresponding to nodes Gn1, Gn2, Gn3) that are direct descendants of parent node A_n. At this point the user can select to navigate in the tree structure by expanding the intermediate node Gn2. In order to do so, the user can send a request for querying of the database 11 to the server 10 by clicking on symbol S2 with a cursor (or using equivalent selection tools). The request is aimed at extracting the information necessary to visualize a new page P on the display 3 from the database 11. The new page will contain a list of textual or graphic symbols S1, S2, S3 corresponding to the intermediate nodes Ar1, Ar2, Ar3.

With reference to FIG. 2, and bearing in mind the information provided in the foregoing, it is possible to infer that it is possible to navigate in the E-catalog through subsequent querying of the database 11, and so explore the tree structure starting from the root node R_n and ending at the leaf nodes T1, . . . , T5 by following, for instance, the path indicated by the arrows 20.

Advantageously, in conformance with the visualization method according to this invention, a comparison takes place between the information extracted from database 11 and sent to user's terminal 2 and the information contained in the history log, which stores data sufficient to identify the catalog items already purchased by the user. For instance, if the history log is stored in the local memory of user's terminal 2, the comparison is accomplished locally at the user's terminal by the data processing means 4.

In the alternative embodiment in which the history log is stored in a memory that is remote with respect to the user's terminal and accessible to the server 10 (for instance in the same database 11 that contains the E-catalog), the comparison is accomplished outside the user's terminal 2, and preferably through the server 10. In this way the server 10 sends the user's terminal 2 data about the E-catalog that are integrated with the information resulting from the comparison with the history log.

In a particularly advantageous embodiment, the data sent to the user's terminal by the server 10 are documents in XML format, irrespective of whether the comparison is performed inside the user's terminal or outside it.

Advantageously, in the method according to this invention, based on the results of the comparison, the visualization of page P on the display 3 is obtained by showing the textual or graphic symbols S1, S2, S3, . . . , Sn in list L with different graphic styles. The different visualization graphic styles are selected according to a coding system which, based on the results of the comparison—as said above—prescribes the use of the following styles on the same page P:

a first graphic style to visualize a symbol (or an element) S1, S2, S3, . . . , Sn in list L, corresponding to an intermediate node which represents a group in the tree structure that includes items all of which had already been purchased by the user (i.e. items which appear to have already been purchased by the user according to the information contained in the history log);

a second graphic style, different from the first, to visualize a symbol (or an element) S1, S2, S3, . . . , Sn in list L that corresponds to an intermediate node that represents a group that does not contain any item previously purchased by the user;

a third graphic style, different from the first and the second style, to visualize a symbol (or element) S1, S2, S3, . . . , Sn in list L that corresponds to an intermediate node that represents a group including at least one item that not yet been purchased by the user.

In a particularly preferred embodiment, in the case of a color display 3, the first, second and third graphic styles have different colors. For instance: the first graphic style is a textual style in a first font, but is destined to be visualized on the display by use of a first color (e.g. white); the second graphic style is a textual style in the first font, but is destined to be visualized on the display by use of a second color (e.g. red); the third graphic style is a textual style in the first font, but is destined to be visualized on the display by use of a third color (e.g. grey).

In an alternative embodiment, which is appropriate in case the display 3 is monochromatic, the first, second and third graphic styles are textual styles characterized respectively by a first, second and third font that are different from one another. For instance, in order to differentiate the three styles, the three texts could be written using a bold type, an underscored type and an italics type.

In the particular case of the visualization of a page P on the display 3, which includes a list of symbols S1, S2, S3, . . . , Sn related to the leaf nodes T1, . . . , T5 of the tree structure, a simpler graphic coding criterion can be used. This criterion, based on the result of the comparison between the data stored in the history log, and those extracted from the database 11, prescribes the use of the following styles on the same page P:

the first graphic style to visualize a symbol (or an element) S1, S2, S3, . . . , Sn in the list L corresponding to a leaf node T1, . . . , T5 that represents an item in the catalog that had already been purchased by the user (i.e. an item that appears to have been already purchased by the user according to the information contained in the history log);

the second graphic style to visualize a symbol (or an element) S1, S2, S3, . . . , Sn in the list L corresponding to a leaf node that represents an item that had not been previously purchased by the user.

For instance, if the items in the E-catalog are music files, each symbol S1, S2, . . . , Sn in the list can be a word corresponding to the title of the track. And in the case of a track already purchased by the user (i.e. a track that appears to have already been purchased by the user following the check of the history log) the word (symbol) will be visualized on the display 3 in white, otherwise the visualization will be in red.

As resulting from the above, it is pointed out that the goals defined for this invention have been fully achieved. In particular, the method concerning the looking through of the E-catalog by a user is very intuitive. Only the actually requested pieces of information are transmitted to the user's terminal by the server, hence the visualization of such pieces of information on a small-size display is particularly easy. Besides, the use of the different characteristics of the graphic styles for the visualizations described above, which applies starting from the intermediate nodes, is able to guide the user during navigation and thus prevents the user from looking through sections of the catalog that contain items already purchased by him/her. In this manner, the time required to look through the catalog is shorter, and this results in a direct economic benefit for the user.

Obviously, a skilled in the art will be able to embody modifications and changes in this invention to meet specific and incidental requirements, but all such modifications and changes are within the scope of the protection of the invention, as defined in the following claims.

The invention claimed is:

1. Method for displaying information related to a catalog on an data processing device including a user's interface comprising a display, said method comprising the following steps:
   connecting the device to a database storing an E-catalog of items that can be purchased by a user through said device; the catalog being organized at logic-content level to present a hierarchical tree structure in which the items that can be purchased are the leaf nodes of the tree, and the groups of items are intermediate nodes of the tree placed at different hierarchical levels that are higher than a hierarchical level of the leaf nodes;
   storing a history log in a memory, which contains information able to permit identification of catalog items already purchased by the user;
   querying the database through said device to visualize on said display a page that corresponds to a portion of the tree structure and includes a list L of textual or graphic symbols corresponding to intermediate nodes of the structure that have same hierarchical level and that descend directly from a same node of the tree structure;
   extracting visualization information necessary to visualize said page from the database;
   comparing the visualization information with said history log;
   visualizing said page on the display, by showing said textual or graphic symbols through different graphic visualization styles according to a graphic coding criterion that, on the basis of the result of the comparison step, provides adoption of:
   a first graphic style to visualize a symbol in the list that corresponds to an intermediate node representing a group including items already purchased by the user;
   a second graphic style, different from the first graphic style, to visualize a symbol in the list that corresponds to an intermediate node representing a group that does not include any item already purchased by the user;
   a third graphic style, different from the first and second graphic styles, to visualize a symbol of the list that corresponds to an intermediate node representing a group that includes at least one item not yet purchased by the user.

2. The method according to claim 1, wherein said visualized page is a navigable page to show selectively on the display further portions of said tree structure, and wherein said querying, extracting, comparing and visualizing steps are repeated for every further portion of the tree structure to be visualized during said navigation.

3. The method according to claim 1, which also includes the following steps:
   querying of the database through said device to visualize on said display a further page corresponding to a portion of said tree structure and including a list of textual or graphic symbols related to leaf nodes;
   extracting of additional information to visualize said further page from the database;
   comparing the extracted additional information with said history log;
   visualization of the further page on the display, by showing said textual or graphic symbols through different graphic visualization styles according to a graphic coding criterion that, on the basis of the result of the comparison step, provides adoption of:
   said first graphic style to visualize a symbol in the list that corresponds to a leaf node representing an item already purchased by the user;
   said second graphic style to visualize a symbol in the list that corresponds to a leaf node representing an item not yet purchased by the user.

4. The method according to claim 1, wherein the display is a color display and wherein said first, second and third graphic styles are graphic visualization styles that use a respective first, second and third color different from one another.

5. The method according to claim 4, wherein the first, second and third colors are respectively: white, red and gray.

6. The method according to claim 1, wherein said first, second and third graphic styles are respectively a first, a second and a third font different from one another.

7. The method according to claim 1, wherein said history log is resident in a memory contained in said device, said method also including a receiving step of said information extracted from the database by said device, and wherein said comparing step is performed inside said device.

8. The method according to claim 7, wherein said memory can be removed from said device.

9. The method according to claim 1, wherein said history log is resident in a memory remote with respect to said device and wherein said comparing step is carried out outside said device, said method also including a receiving step of the information resulting from the comparison by said device.

10. The method according to claim 1, wherein the device is a mobile communication terminal.

11. The method according to claim 1, wherein the items that can be purchased are multi-media files.

12. The method according to claim 11, wherein said files can be downloaded in a memory of said device.

13. A computer-readable storage medium having stored thereon computer-executable instructions for displaying on a display of a data processing device, information related to a catalog, by performing the steps of:
   querying a database in which is stored an E-catalog of items that can be purchased by a user through said device, wherein the catalog is organized at a logic-content level to present a hierarchical tree structure in which the items that can be purchased are the leaf nodes of the tree, and the groups of items are intermediate nodes of the tree placed at different hierarchical levels that are higher than a hierarchical level of the leaf nodes;
   extracting visualization information necessary to visualize a page that corresponds to a portion of the tree structure and includes a list of textual or graphic symbols corresponding to intermediate nodes of the structure that have same hierarchical level and that descend directly from a same node of the tree structure;

comparing the visualization information with a history log that contains information able to permit identification of catalog items already purchased by the user; and visualizing said page on the display, by showing said textual or graphic symbols through different graphic visualization styles according to a graphic coding criterion that, on the basis of the result of the comparison step, provides adoption of:

- a first graphic style to visualize a symbol in the list that corresponds to an intermediate node representing a group including items already purchased by the user;
- a second graphic style, different from the first graphic style, to visualize a symbol in the list that corresponds to an intermediate node representing a group that does not include any item already purchased by the user; and
- a third graphic style, different from the first and second graphic styles, to visualize a symbol of the list that corresponds to an intermediate node representing a group that includes at least one item not yet purchased by the user.

14. A device for use in an E-commerce system, the device comprising:

a graphics display;

a communication interface;

a local memory that includes a history log containing identification information of at least one item that has already been purchased by a user of the device, from an E-catalog of items; and a processing unit configured for executing program code that implements the following steps:

transmitting through the communication interface, to a server, a query to access a database in which is stored the E-catalog of items that can be purchased by the user through the device, wherein the catalog is organized at a logic-content level to present a hierarchical tree structure in which the items that can be purchased are the leaf nodes of the tree, and the groups of items are intermediate nodes of the tree placed at different hierarchical levels that are higher than a hierarchical level of the leaf nodes;

extracting visualization information necessary to visualize a page that corresponds to at least a portion of the tree structure and includes a list of textual or graphic symbols corresponding to intermediate nodes of the structure that have same hierarchical level and that descend directly from a same node of the tree structure;

comparing the visualization information with the history log stored in the local memory; and visualizing said page on the graphics display, by showing said textual or graphic symbols through different graphic visualization styles according to a graphic coding criterion that, on the basis of the result of the comparison step, provides adoption of:

- a first graphic style to visualize a symbol in the list that corresponds to an intermediate node representing a group including items already purchased by the user;
- a second graphic style, different from the first graphic style, to visualize a symbol in the list that corresponds to an intermediate node representing a group that does not include any item already purchased by the user; and
- a third graphic style, different from the first and second graphic styles, to visualize a symbol of the list that corresponds to an intermediate node representing a group that includes at least one item not yet purchased by the user.

* * * * *